United States Patent
Watts et al.

(10) Patent No.: US 10,951,620 B2
(45) Date of Patent: Mar. 16, 2021

(54) SYSTEMS AND METHODS FOR USE IN NETWORK SERVICES MIGRATION

(71) Applicant: MASTERCARD INTERNATIONAL INCORPORATED, Purchase, NY (US)

(72) Inventors: Peter Joseph Watts, Chesterfield, MO (US); Andrew Kang, St. Louis, MO (US); Darragh Whelan, St. Charles, MO (US); Sara E. Fiebiger, Ellisville, MO (US); Carolina Wirthmann, Lake St. Louis, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 217 days.

(21) Appl. No.: 16/114,910

(22) Filed: Aug. 28, 2018

(65) Prior Publication Data

US 2020/0076810 A1 Mar. 5, 2020

(51) Int. Cl.
*H04L 12/24* (2006.01)
*G06F 21/62* (2013.01)
*G06Q 40/02* (2012.01)
*H04L 29/06* (2006.01)

(52) U.S. Cl.
CPC ............ *H04L 63/101* (2013.01); *G06F 21/62* (2013.01); *G06Q 40/02* (2013.01); *H04L 41/50* (2013.01)

(58) Field of Classification Search
CPC ....... H04L 63/101; H04L 41/50; G06F 21/62; G06Q 40/02; G06Q 20/4016; G06Q 20/10; G06Q 30/0253
See application file for complete search history.

(56) References Cited

U.S. PATENT DOCUMENTS

| 7,333,953 | B1* | 2/2008 | Banaugh | G06Q 20/02 705/39 |
| 8,301,529 | B1* | 10/2012 | Anderson | G06Q 40/00 705/35 |
| 8,364,583 | B1* | 1/2013 | Mussman | G06Q 10/06 705/39 |
| 2007/0027919 | A1* | 2/2007 | Mastel | G06Q 30/06 |
| 2008/0154783 | A1* | 6/2008 | Rule | G06Q 50/188 705/80 |
| 2008/0162317 | A1* | 7/2008 | Banaugh | G06Q 20/04 705/35 |

(Continued)

*Primary Examiner* — Shanto Abedin
(74) *Attorney, Agent, or Firm* — Harness, Dickey & Pierce, P.L.C.

(57) ABSTRACT

Systems and methods are provided for migration of users to one or more services offered by a service host. An exemplary method includes detecting, by a computing device associated with the service host, a first dispute message associated with a user and transmitted from a dispute service of the service host to a clearing service of the service host, and appending the user to a black list in response to the first dispute message. The method also includes detecting, by the computing device, a second dispute message associated with the user and transmitted to the clearing service, determining whether the user is included in the black list, and rejecting the second dispute message when the user is included in the black list, thereby inhibiting the user from transmitting the second dispute message to the clearing service outside of the dispute service.

17 Claims, 3 Drawing Sheets

(56) References Cited

U.S. PATENT DOCUMENTS

| | | | | |
|---|---|---|---|---|
| 2011/0022483 A1* | 1/2011 | Hammad | ............... | G06Q 40/02 |
| | | | | 705/17 |
| 2011/0276475 A1* | 11/2011 | Godejohn | .............. | G06Q 20/10 |
| | | | | 705/39 |
| 2012/0166283 A1* | 6/2012 | Berliner | ............. | G06Q 30/0261 |
| | | | | 705/14.58 |
| 2012/0259781 A1* | 10/2012 | Fote | ...................... | G06Q 20/40 |
| | | | | 705/44 |
| 2015/0193775 A1* | 7/2015 | Douglas | ............. | G06Q 30/0253 |
| | | | | 705/14.23 |
| 2015/0379415 A1* | 12/2015 | Fondekar | ............. | G06Q 30/016 |
| | | | | 706/11 |
| 2017/0124571 A1* | 5/2017 | John | .................. | G06Q 20/4012 |
| 2019/0095789 A1* | 3/2019 | Stopic | ...................... | G06N 3/08 |

* cited by examiner

SYSTEMS AND METHODS FOR USE IN NETWORK SERVICES MIGRATION

FIELD

The present disclosure generally relates to systems and methods for use in network services migration, and in particular, to systems and methods for use in detecting access to one or more services and limiting access to one or more other services based on the detected access, by users to the one or more services.

BACKGROUND

This section provides background information related to the present disclosure which is not necessarily prior art.

Entities often provide services for use by users through networks. For example, payment networks provide various services to banking institutions, by which payment account transactions are known to be authorized, cleared and settled. Additional services may be provided, by the payment networks, which provide ancillary interactions between the banking institutions. In one specific example, the payment networks offer document services, whereby banking institutions are permitted to upload documentary evidence related to chargebacks. Other services are known to be offered by the payment networks and other entities. From time to time, the entities are known to replace existing services with new, and often, improved services. In connection therewith, the entities continue to offer the existing services for a period of time and then, ultimately, halt the services, thereby forcing the users onto the new services from the existing services.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Services, which are offered by entities, may be replaced by new services, where the older, existing services are referred to as legacy services. Entities often experience slow migration from the legacy services to the new services, potentially because the users have become accustomed to or familiar with interfaces and/or features of the legacy services and therefore resist the migration. To encourage migration, entities may impose cutoff deadlines, after which the legacy services will be unavailable. Consequently, users who ignore the deadlines may be without the services until the users can be provisioned and/or on-boarded into the new services. This may provide interruptions in services and harm to user-entity relations. Uniquely, the systems and methods herein permit migration of users to new services, where the users are restricted from legacy services once actions through the new services, by the users, are identified. In particular, a service may be provided to a user, where the service is associated with a particular function. When the user interacts with the service, a decision management platform (DMP) detects the use of the service and appends the user to a black list. The DMP then employs the black list to inhibit the user from using a prior, legacy or alternate service or scheme associated with the particular function. In this manner, users are permitted to migrate to services, such as, for example, new services, from legacy services, but are rejected from returning to the legacy or alternate services after such migration. As such, migration of users to services is more efficient and more effective.

Figure 1:
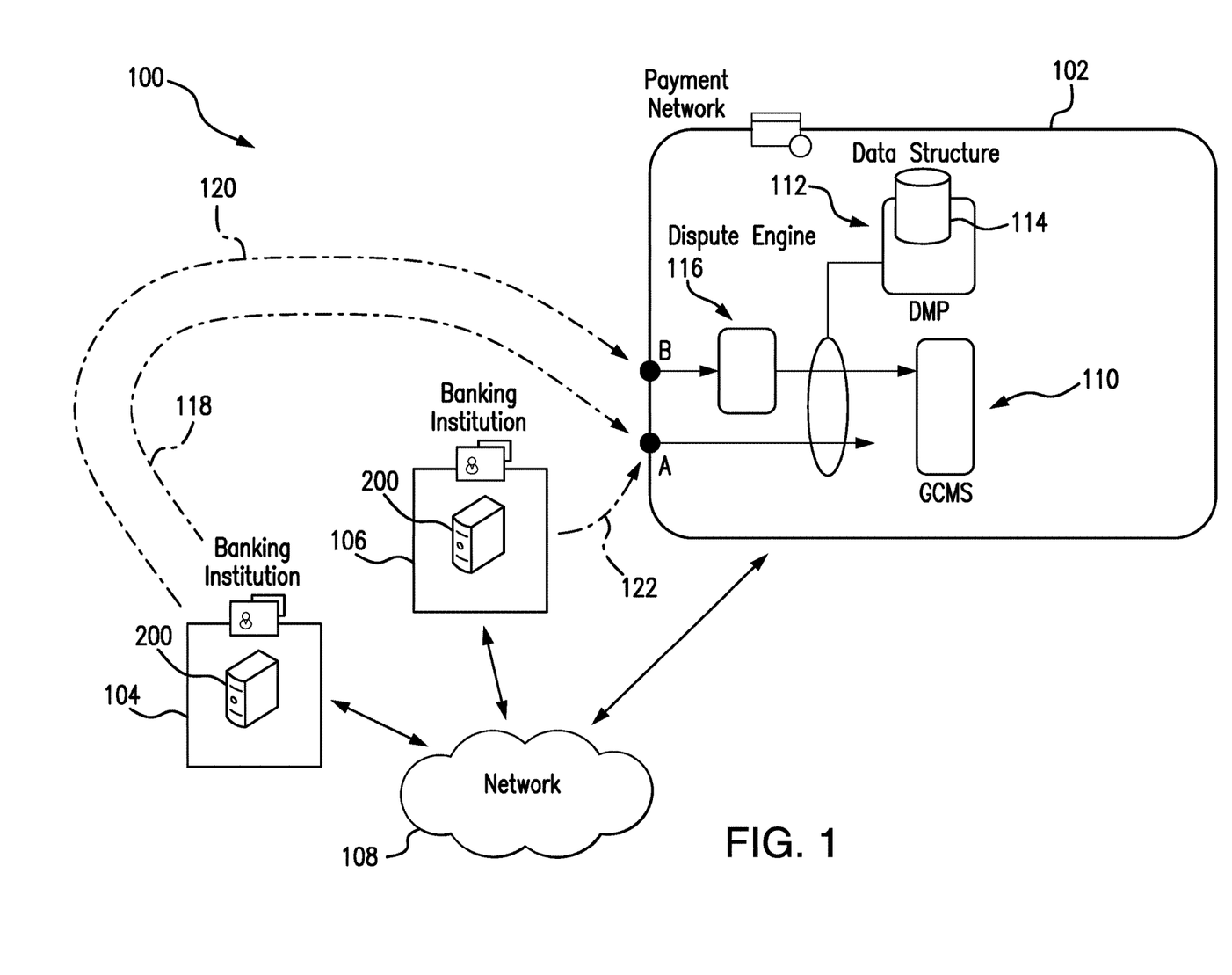
FIG. 1 illustrates an exemplary system for use in migration of users to one or more services (e.g., from one or more different services, etc.), and including one or more aspects of the present disclosure.

FIG. 1 illustrates an exemplary system 100, in which one or more aspects of the present disclosure may be implemented. Although parts of the system 100 are presented in one arrangement, other embodiments may include the same or different parts arranged otherwise, depending, for example, on types of services offered, accessibility to the services, different users of the services, etc.

The illustrated system 100 generally includes a payment network 102 and two banking institutions 104 and 106 (broadly, users), each coupled to network 108. The network 108 may include, without limitation, one or more local area networks (LANs), wide area networks (WANs) (e.g., the Internet, etc.), mobile networks, virtual networks, other networks as described herein, and/or other suitable public and/or private networks capable of supporting communication among two or more of the illustrated parts, or even combinations thereof. In one example, the network 108 includes multiple networks, where different ones of the multiple networks are accessible to different ones of the illustrated components in FIG. 1. In particular, the payment network 102 and the banking institution 104 may be connected via a private network for processing payment-related transactions and, separately, the payment network 102 may be connected to the banking institution 106 through a public network, such as the Internet.

Generally in the system 100, the payment network 102 is a payment service provider, or more generally a service host herein (e.g., a provider of or host for services, etc.), which is configured to facilitate payment account transactions to payment accounts. The payment network 102 may include, for example, without limitation Mastercard International Incorporated, VISA, American Express, etc. In this exemplary embodiment, each of the banking institutions 104 and 106 includes a financial institution that provides and/or issues payment accounts to consumers (not shown) (e.g., whether individual persons, entities, companies, businesses, etc.). The accounts, which may include credit accounts, debit accounts, prepaid accounts, etc., may then be used by the consumers to fund payment account transactions for the purchase of products (e.g., goods or services, etc.).

With that said, in one exemplary embodiment, consistent with the conventional four-party model, a consumer may present an account to a merchant (not shown), by way of a payment device associated with the account, etc., who generates and provides an authorization request to the payment network 102 (via an acquirer) for a corresponding transaction. The payment network 102, in turn, passes the authorization request to the banking institution 104, for example (as the issuer of the account). The banking institution 104 then determines whether to authorize the transaction (e.g., based on a status of the account and/or funds/credit remaining in the account, etc.). Thereafter, the banking institution 104 responds with an authorization reply to the payment network 102, which passes the authorization reply to the merchant (via the acquirer). When approved, the transaction is later cleared and settled among the payment network 102, the banking institution 104, and the acquirer (as issuer of an account for the merchant to which funds for the transaction are added).

Transaction data is stored in connection with each transaction at the payment network 102 and/or the banking institution 104 (or banking institution 106, when involved). Specific rules may be imposed by the payment network 102, for example, related to the types of data and documents which are associated with the transaction and need to be preserved for the transaction (e.g., to evidence the transaction and/or the participation of the consumer, etc.).

As shown in FIG. 1, the payment network 102 includes a global clearing management system (GCMS) 110, which is a clearing service configured to receive and manage messaging used by the payment network 102 for clearing and/or settlement of transactions submitted thereto. The messages may include, for example, indications of the positions of the banking intuitions 104 and 106 at the end of clearing cycles, etc. For example, the banking intuitions 104 and 106 may owe funds to different other banking intuitions, while being owed funds from still other banking intuitions. In general, the GCMS 110 is configured to aggregate transactions within a clearing cycle to minimize, limit or reduce the clearing messages between different banking intuitions, including the banking institutions 104 and 106. In connection therewith, the GCMS 110 is configured to transmit and receive messages according to the format of the payment network 102, which, in this exemplary embodiment, includes the ISO 8583 international standard format for financial transaction card originated messages. That said, it should be understood that other formats and/or standards may be employed in other payment network embodiments, whereby the GCMS 110 would be configured accordingly.

In addition, the payment network 102 includes a decision management platform (DMP) 112 and a data structure 114 associated therewith. The DMP 112 is configured to provide rule-based decisions for the processing of authorizations of transactions facilitated by the payment network 102. Moreover, the DMP 112 is configured to impose rule-based analysis on clearing transactions, as directed to the GCMS 110. In addition to rules associated with chargebacks, as described in more detail below, the rules-based analysis is often, for either authorization or clearing, related to fraud prevention and/or suspicious behaviors, etc., whereby the DMP 112 may be configured to alter and/or decline transactions that are believed (based on the rules) to be fraudulent and/or suspicious. The data structure 114 includes an in-memory data grid, such as, for example, the GemFire Grid by Pivotal,®, etc., and is illustrated partially within the DMP 112 to indicate that the data structure 114 may be included as part of the DMP 112. Alternatively, the data structure 114 may be included as a separate part of the system 100 and coupled in communication with the DMP 112.

And, also, as shown in FIG. 1, the payment network 102 includes a dispute engine 116 (e.g., a new dispute service provided by the payment network 102, etc.), which is configured to provide a dispute resolution service to the banking institutions 104 and 106. In particular, the dispute engine 116 is configured to be accessible, by the banking institutions 104 and 106, for example, through application programming interface (API) messages, etc., and to receive dispute messages directly from the banking institutions 104 and 106. As referenced herein, the dispute engine 116 provides a "new" service to the banking institutions 104 and 106. In addition, although not shown, the payment network 102 includes a legacy dispute service, which is used in conjunction with the GCMS 110 to provide limited services related to disputes, such as, for example, gathering documentation associated with dispute resolution.

In the context of the system 100, from time to time, payment account transactions may be challenged, for example, as fraudulent or unauthorized. As part of that challenge, a dispute claim or chargeback is submitted by the involved one of the banking institutions 104 and 106 through one of two routes, designated A and B in FIG. 1.

Route A is a conventional route, by which each of the banking institutions 104 and 106 may submit a message associated with a customer (or consumer) dispute through the GCMS 110 (e.g., as an ISO 8583 message), which is received by the payment network 102. In particular, for example, where a consumer, who is issued a payment account by the banking institution 104, believes that a transaction was funded by the consumer's account without permission (e.g., an unauthorized transaction, a fraudulent transaction, etc.) or that the transaction included an error (e.g., a duplicate charge, a wrong amount, etc.), or potentially, that a merchant involved in the transaction failed to perform in one or more manners, etc., the consumer will contact the banking institution 104, for example. Commonly, this may be referred to as a consumer initiated dispute. In turn, the banking institution 104 (i.e., as the issuer of the payment account to which the transaction was posted) submits a chargeback request through the payment network 102 to the other banking institution involved in the transaction (i.e., the acquirer for the merchant). In this way, the chargeback request (or broadly, a message) is submitted to the GCMS 110, which is configured to identify the message, based on a message type indicator or MTI included in the message, as being a dispute (or chargeback) message and to forward the message on to the acquirer banking institution. For a First Presentment of the chargeback, or an Arbitration Chargeback (discussed below), the MTI is 1442, and for a Second Presentment of the chargeback (or Representment) (discussed below), the MTI is 1240. In the first case (where the MTI is 1442), upon receipt of the message, the GCMS 110 is configured to provide the chargeback transaction into the clearing and settlement process, whereby funds associated with the transaction are reversed (i.e., removed from the merchant's account at the acquirer banking institution and added to the consumer's account at the banking institution 104). And in the second case (where the MTI is 1240), upon receipt of the message, the GCMS 110 is configured to provide the chargeback transaction into the clearing and settlement process, whereby funds associated with the transaction are removed from the consumer's account and added to the merchant's account.

Then in this example, upon receipt of the dispute message, the acquirer banking institution is configured to either resolve the dispute in favor of the consumer or the merchant, or forward the dispute message, or part thereof, to the merchant. When provided to the merchant, the merchant will either agree to the chargeback or submit a response, often including documentary evidence of the transaction (e.g., a consumer's signature, a receipt, etc.), to the acquirer banking institution. The acquirer banking institution is configured to then determine, based on the merchant's response, whether to resolve the dispute in favor of the consumer (e.g., for lack of evidence by the merchant, etc.) or to submit the chargeback to the banking institution 104 (i.e., the issuing banking institution 104 in this example). When the dispute is submitted to the banking institution 104 (via the GCMS 110), it is done so as a Second Presentment (or Representment), and, in response, the GCMS 110 is configured to cause funds associated with the transaction to be removed from the consumer's account and added to the merchant's account. Upon receipt of the chargeback, the banking institution 104 is configured to determine whether the dispute should be resolved for the consumer or the merchant. If the dispute is resolved for the consumer, the banking institution 104 is configured to raise an arbitration with the payment network 102, for example, whereby the payment network 102 may then determine the final outcome (e.g., if the payment network 102 also resolves the dispute for the consumer, the appropriate funds are removed from the merchant's account and added to the consumer's account, etc.). Conversely, if the banking institution 104 resolves the dispute for the merchant, no further action is taken and the funds remain in the merchant's account (for the chargeback cycle).

Route B in the system 100 represents an alternate service for disputes, which is directed to the dispute engine 116 (and not directly to the GCMS 110). As such, in this scenario, when the banking institution 104 receives a dispute from a consumer for a transaction facilitated by the payment network 102, the banking institution 104 may be configured to submit the dispute to the dispute engine 116 (e.g., via a web service API channel and a user interface (UI), etc.), which in turn, is configured to employ business rules associated with the dispute and collect appropriate evidence of the transaction and/or the dispute (e.g., in connection with submitting a dispute message to the GCMS 110, etc.). In particular, Route B is provided to allow the banking institution 104 (and other banking institutions) to provide and submit dispute messages and documentary evidence of the transaction together (where in Route A, the banking institution 104 may be required to provide the dispute messages separate from any documentary evidence).

In the illustrated system 100, the banking institutions 104 and 106 are encouraged to migrate to the dispute engine 116 (Route B), in lieu of providing dispute messages directly through the GCMS 110 (Route A). Accordingly, the payment network 102 coordinates with the banking institutions 104 and 106 to on-board or provision the banking institutions 104 and 106 to the dispute engine 116 (e.g., by setting up accounts, providing authorized users, etc.). Once provisioned to the dispute engine 116, the banking institutions 104 and 106, for example, are able to access the dispute engine 116 and to submit one or more dispute messages through the dispute engine 116. In this exemplary embodiment, the banking institution 104 is provisioned to the dispute engine 116, but the banking institution 106 is not.

When the banking institution 104 receives a dispute from a consumer for a transaction, the banking institution 104 submits a chargeback (or dispute) message to the payment network 102 along Route A, as described above (referenced generally at path 118). In this exemplary embodiment, the DMP 112 is configured to identify the message as being a chargeback related message based on the MTI included in the message. The DMP 112 is configured to then search for the banking institution 104, as the submitter of the message, in a black list of banking institutions in the data structure 114. Because the banking institution 104 has recently been provisioned to the dispute engine 116 (and has not yet submitted a dispute message to the dispute engine 116), the banking institution 104 is not included in the black list, and the DMP 112 is configured to permit the dispute message to proceed directly to the GCMS 110 along Route A.

Later, however, the banking institution 104 submits a dispute message regarding a transaction through the dispute engine 116, referenced generally at path 120. In response, the dispute engine 116 is configured to process the dispute and gather any documentary evidence regarding the transaction, and then transmit the dispute message to the GCMS 110 when appropriate (whereby the chargeback cycle proceeds, for example, as a first presentment, second presentment, arbitration, etc.). For example, the dispute engine 116 may communicate with the acquirer banking institution to receive its decision, provide a response to the merchant (including evidence), as applicable, and further communicate with the banking institution 104 to receive its decision for the dispute, etc. Ultimately, through the communications with the banking institutions (apart from the GCMS 110), the dispute engine 116 decides a resolution. When the resolution of the dispute is in favor of the merchant, the dispute engine 116 will not transmit a chargeback message. However, when the dispute engine 116 reaches a resolution of the dispute in favor of the consumer, the dispute engine 116 is configured to transmit a dispute message (consistent with resolution of the dispute (e.g., a chargeback message, etc.)) to the GCMS 110 (for refund of the transaction amount). In connection therewith, the DMP 112 is configured to identify the dispute message as being from the dispute engine 116 (e.g., based on a file-type code included in the dispute message having a particular value or setting (e.g., a PDS 0105.1—File Type code having a value of 906, etc.), etc.), and to append the banking institution 104 to a black list of banking institutions in the data structure 114. It should be appreciated that the DMP 112 may further be configured to maintain a count of dispute messages and associated banking institutions, whereby the DMP 112 is configured to only append the banking institution 104 to the black list when a threshold number of chargeback messages are received from the dispute engine 116 in association with the banking institution 104. The threshold may include three messages, five message, ten messages, twenty messages, etc., which may, in some embodiments, provide the banking institution 104 sufficient experience, or grace period, with the dispute engine 116 prior to appending the banking institution 104 to the black list. The DMP 112 may further be configured to check the black list for the banking institution 104, prior to adding it (to avoid duplicates), or the data structure 114, which includes the backlist, may be configured to avoid and/or eliminate duplicates within the black list (in response to the DMP's request to add the banking institution 104 or later).

Thereafter, the DMP 112 is configured to restrict dispute messages from black listed banking institutions, from being submitted directly through the GCMS 110. Specifically, now, when the banking institution 104 submits a dispute message through Route A (after being appended to the black list), the DMP 112 is again configured to identify the dispute message as being a chargeback message (e.g., based on the MTI of the message, a file-type code in the message, etc.), to identify the banking institution 104, and to search in the black list for the banking institution 104. When identified in the black list, the DMP 112 is configured to reject (or to directed the GCMS 110 to reject) the dispute message (e.g., through a decline response, etc.), and, potentially, direct the banking institution 104 to the dispute engine 116 (e.g., through a corresponding API, etc.), to which the banking institution 104 is already provisioned (as evident by its placement on the black list).

Notwithstanding the above, as shown in FIG. 1, the banking institution 106 from time to time will submit a dispute message along Route A, such as referenced at path 122. In this instance, the DMP 112 is configured to detect the dispute message and to search in the black list in the data structure 114. However, since the banking institution 106 is not yet provisioned to the dispute engine 116, and has not submitted a dispute message through the dispute engine 116, the banking institution 106 will not be on the black list, and thus, the dispute message will be permitted to pass to the GCMS 110 as is conventional (and as described above).

It should be appreciated that while the above description is provided, in general, with respect to First Presentments of dispute messages (thereby limiting the banking institution's submissions to First Presentment dispute messages), the black list may be applicable to Second Presentments (or Representments) of dispute messages and Arbitration Chargebacks as well, when the banking institution 104, for example, is appended to the black list based on prior use of the dispute engine 116. Or, it may be separately applicable for Second Presentments (or Representments), whereby Representment messages will only be blocked or restricted when the banking institution 104 is appended to a black list specific to those types of messages (i.e., through submission of the Representment messages through the dispute engine 116 (once or based on the above described thresholds)). For example, an acquirer banking institution may submit a Representment for a disputed transaction, and thus may be appended to a "Representment" backlist when it has submitted one or a threshold number of Representment messages to the dispute engine 116. With that said, generally, for First Presentments of dispute messages and Arbitration Chargeback messages, the black list will include the same institutions (since if banking institution 104, for example, is blocked for first chargebacks, it would also be blocked for arbitration chargebacks).

While the above example, and FIG. 1, are described with reference to services related to dispute resolution for transactions, the disclosure is directed to migration between any services, whether related to disputes or not. In fact, the services may or may not be related to payment account transactions, as long as one or more service(s) is provided, and an intent exists to migrate its users to one or more new and/or different service(s). For example, the services may include and/or relate to, without limitation, telecommunication services and/or devices (e.g., to encourage upgrades to new plans and/or technologies, etc.), insurance services (e.g., to encourage customers to migrate to new coverage policies, etc.), customer business services (e.g., to encourage customers to switch to new versions of products (e.g., software, memberships, etc.), etc.) or other suitable situations when users migrate from one version, service, or product to another version, service, or product, etc.

Figure 2:
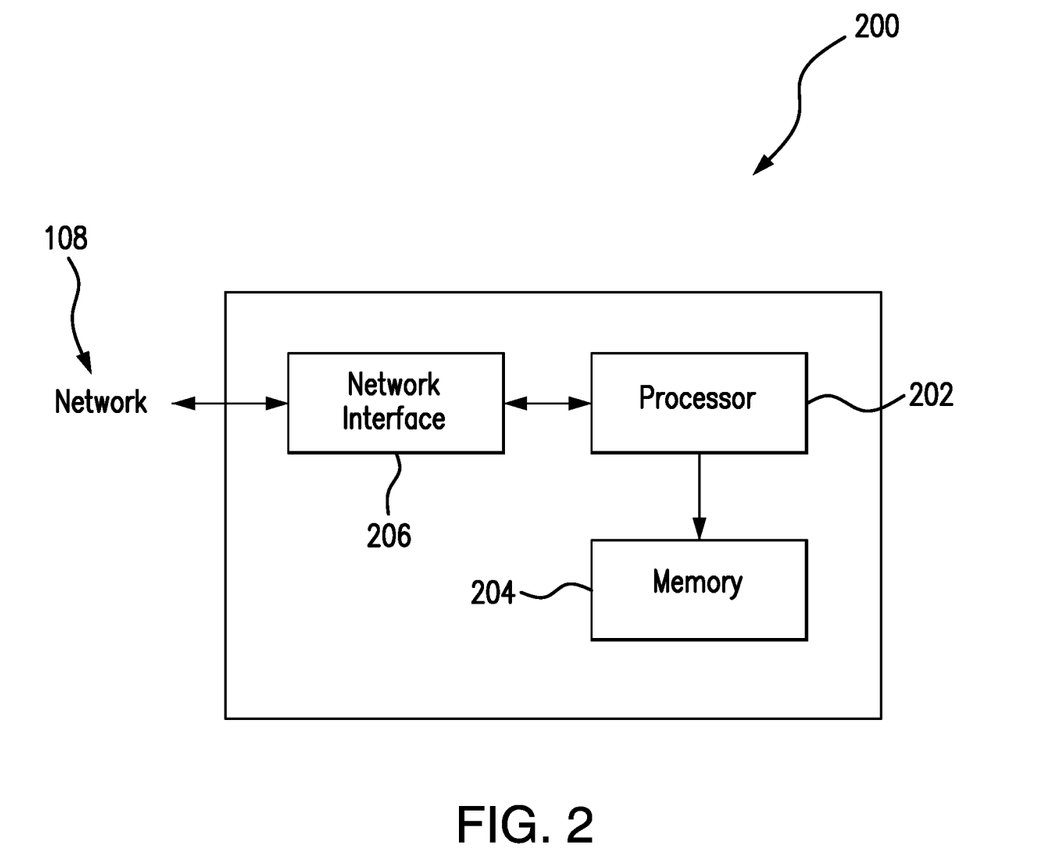
FIG. 2 is a block diagram of an exemplary computing device that may be used in the system of FIG. 1.

FIG. 2 illustrates an exemplary computing device 200 that can be used in the system 100. The computing device 200 may include, for example, one or more servers, workstations, personal computers, laptops, tablets, smartphones, other suitable computing devices, etc. In addition, the computing device 200 may include a single computing device, or it may include multiple computing devices located in close proximity, or multiple computing devices distributed over a geographic region, so long as the computing devices are specifically configured to function as described herein. In the exemplary embodiment of FIG. 1, each of the banking institutions 104 and 106 are illustrated as including, or being implemented in, computing device 200, coupled to the network 108. In addition, the payment network 102 in general, and each of the GCMS 110, the DMP 112, the data structure 114 and the dispute engine 116 (individually or together) may be considered a computing device, or may be considered including and/or implemented in a computing device, consistent with the computing device 200. With that said, the system 100 should not be considered to be limited to the computing device 200, as described below, as different computing devices and/or arrangements of computing devices may be used. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, transaction data, black lists, and/or other data suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 and/or other computer system components configured to perform one or more of the various operations herein. It should be appreciated that the memory 204 may include a variety of different memories, each implemented in one or more of the functions or processes described herein.

Further, the illustrated computing device 200 also includes a network interface 206 coupled to (and in communication with) the processor 202 and the memory 204. The network interface 206 may include, without limitation, a wired network adapter, a wireless network adapter (e.g., a near field communication (NFC) adapter, a Bluetooth adapter, etc.), a mobile network adapter, or other device capable of communicating to one or more different networks, including the network 108.

Figure 3:
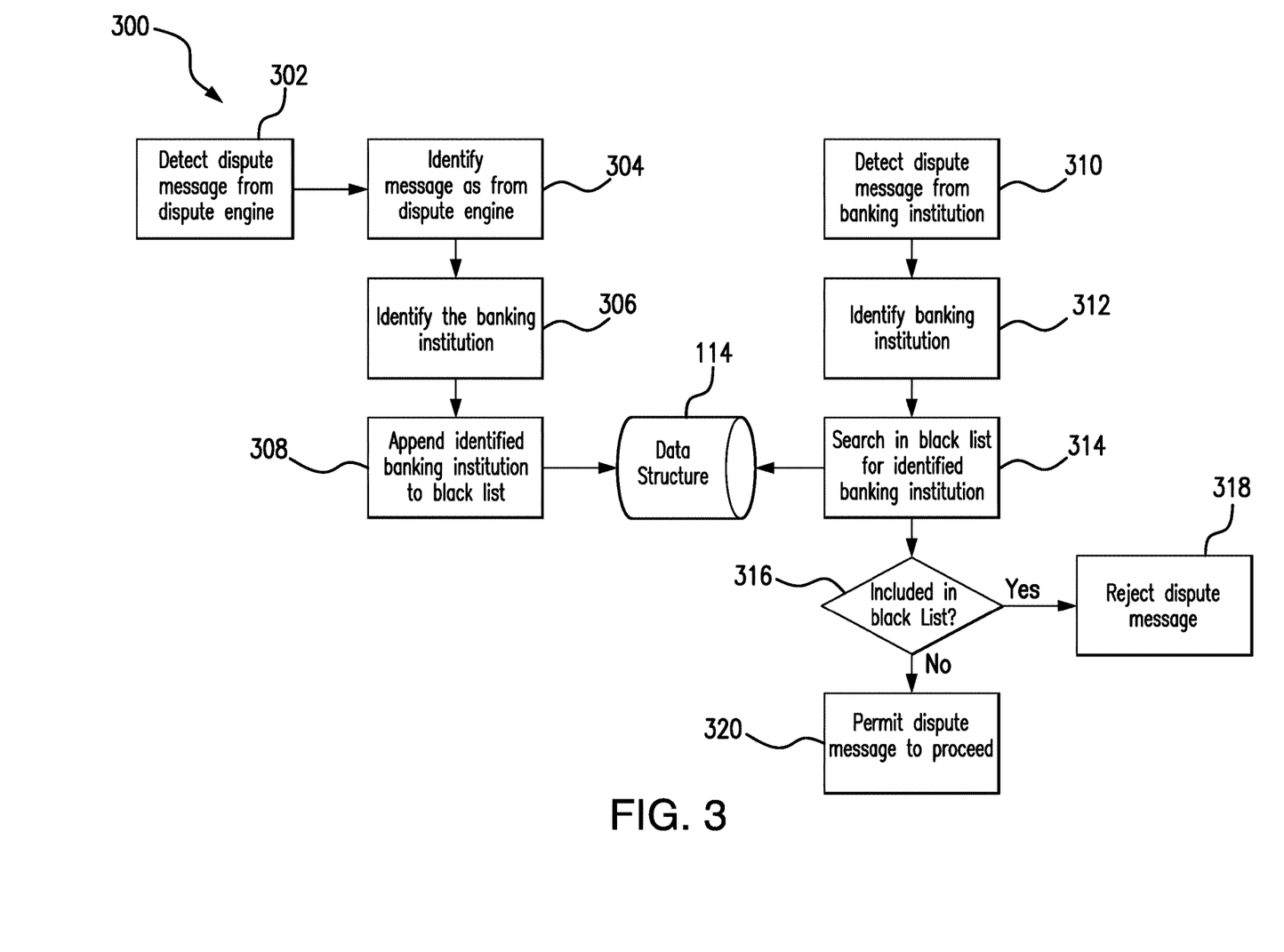
FIG. 3 is an exemplary method for use in enforcing migration of users to one or more services, and which can be implemented via the system of FIG. 1.

FIG. 3 illustrates an exemplary method 300 for enforcing migration of users to services. The exemplary method 300 is described (with reference to the system 100 of FIG. 1) as implemented in the DMP 112 and the GCMS 110 of the payment network 102, in connection with the banking institutions 104 and 106 (broadly, users), and with further reference to the computing device 200. As should be appreciated, however, the methods herein should not be understood to be limited to the exemplary system 100 or the exemplary computing device 200, and the systems and the computing devices herein should not be understood to be limited to the exemplary method 300.

In connection with method 300, it should be assumed that the banking institution 104 is provisioned to the dispute engine 116, but has not yet submitted any dispute messages and/or requests to the payment network 102 via the dispute engine 116.

That said, initially, in connection with a transaction to an account issued by the banking institution 104, the consumer to which the account is issued submits a dispute to the banking institution 104. In response, the banking institution 104 submits a dispute message to the payment network 102, and specifically, to the dispute engine 116, through an interface associated therewith. In this example, the dispute engine 116 receives the dispute message and communicates the dispute message with an acquirer banking institution for the merchant involved in the transaction (apart from any message from the GCMS 110). The acquirer banking institution is then able to view the dispute message and/or information relevant thereto in an interface provided by the dispute engine 116. If the acquirer bank is not yet provisioned to the dispute engine 116, it will still be able to view and respond to the chargeback through Route A. Within the interface, consistent with the description above, the acquirer banking institution either indicates the transaction dispute is approved, or may direct the message to the merchant. When directed to the merchant, the acquirer banking institution will receive a response from the merchant (outside of the dispute engine 116) and then append that response to the interface of the dispute engine 116 (or transmit it directly to the GCMS 110 via a corresponding interface, if not yet provisioned to the dispute engine 116). This response may include an indication of an approval of the dispute, or it may include uploading evidence of the transaction to the interface, and more generally, the dispute engine 116 or GCMS 110, as appropriate. When the acquirer banking institution intends to continue the dispute, the acquirer banking institution requests a Representment, either through the interface of the dispute engine 116 (apart from any message to the GCMS 110) (when provisioned and on boarded to the dispute engine 116), or via Route A to the GCMS 110 if not yet provisioned to the dispute engine 116.

When the acquirer banking institution is provisioned to the dispute engine 116, and upon receipt of the Representment, the dispute engine 116 then notifies the banking institution 104 of the addition of the acquirer banking institution's response. In turn, the banking institution 104 is able to view, in an interface provided by the dispute engine 116, the approval by the acquirer banking institution or the evidence in support of the transaction from the merchant. As such, the banking institution 104 is able to review the information, in the interface from the dispute engine 116, and make a determination to proceed in the dispute (through arbitration) or not. If the banking institution 104 persists in the dispute, the arbitration is decided based on rules and/or internal data associated with the payment network 102. Regardless of how the dispute is resolved, no chargeback messages are provided, through the GCMS 110, until the dispute is resolved (and when both banking institutions are provisioned and using the dispute engine 116). And then, when resolved, by the banking institution 104, the acquirer banking institution, or through arbitration, the dispute engine 116 submits a dispute message to the GCMS 110.

Referring now to FIG. 3, the DMP 112 detects the dispute message from the dispute engine 116, at 302. The DMP 112 will specifically detect, in this exemplary embodiment, only three types of dispute messages: First Presentment Chargebacks, Representments, and Arbitration Chargebacks. As explained above, each of these messages is different, but part of the dispute process by the payment network 102, and thus the messages are expected to be handled by the dispute engine 116 for banking institutions that have migrated to the dispute engine 116. The messages will be identified, by the DMP 112, based on the MTI included in the messages (i.e., which is indicative of the types of the messages (e.g., 1442 for First Presentment Chargebacks and Arbitration Chargebacks, and 1240 for a Second Presentment (or Representment), etc.).

Upon detection, the DMP 112 identifies, at 304, the dispute message as being handled by the dispute engine 116. Specifically, the DMP 112 reads a data element (DE) within the message, such as, for example, DE PDS105 subfield 1, ("File Type Code") (e.g., including three digits, etc.). When the data element includes a unique defined value, such as, for example, "509" or "906", etc., the DMP 112 identifies the message as originating at the dispute engine 116. The DMP 112 then identifies, at 306, the banking institution 104 based on an Interbank Card Association (ICA), for example, included in the dispute message, and appends, at 308, the banking institution 104 (or identifier associated therewith) to the black list included in the data structure 114. In this manner, the banking institution 104 is known to the DMP 112 as being able to submit and/or experienced in submission of disputes through the dispute engine 116, and therefore, for example, may be able to avoid submitting dispute messages directly to the GCMS 110.

Optionally, as described above, the DMP 112 may determine how many dispute messages have been received through the dispute engine 116 for the banking institution 104, and only when that number exceeds a threshold number (e.g., ten dispute messages, etc.) will the DMP 112 append the banking institution 104 to the black list included in the data structure 114. As indicated above, the threshold may be employed, optionally, as a grace period to permit the banking institution to become familiar with and/or gain experience with the dispute engine 116, and the interfaces provided thereby, prior to appending the banking institution 104 to the black list (and effectively limiting dispute messages to the dispute engine 116, as described below). It should further be appreciated that the threshold may include a different number of dispute messages, which may be in general, or specific, to the type of the dispute messages (e.g., First Presentment Chargebacks, Representments, or Arbitration Chargebacks, etc.)

It should further be appreciated that the method 300, or part thereof, as described above, may be repeated over and over again until such a threshold is satisfied. In addition, the operations described above may be repeated for each of the types of dispute messages (i.e., First Presentment Chargebacks, Representments, and Arbitration Chargebacks), whereby a black list for each type of dispute message is maintained in the data structure 114.

Thereafter in the method 300, the banking institution 104 submits a dispute message to the GCMS 110, and not to the dispute engine 116. In this example, the DMP 112 detects, at 310, the dispute message as being directed to the GCMS 110 from the banking institution 104, based on the MTI included in the dispute message. The DMP 112 then identifies, at 312, the banking institution 104 based on a unique identifier for the banking institution 104 (e.g., from the ICA included in the dispute message, etc.) and searches, at 314, in the data structure 114, and specifically, in the black list (e.g., specific to the type of dispute message indicated by the MTI, etc.) for the banking institution 104 (or unique identifier associated therewith).

Specifically, the DMP 112 may employ the specific rules illustrated in Table 1 below to determine if the banking institution 104 is included in the black list. In so doing, the DMP 112 may translate the logic rules in Table 1 into java code that will be applied to the dispute message, which is also converted to java format by the DMP 112.

TABLE 1

Sample Rule to Block Dispute Message Based on Black List if
   the the PDS 0105.1 - File Type Code is not "906" (message is not coming from new dispute system 116)
   and the Message Type Indicator is # "1442"
   and the DE 24 - Function Code is one of { 450 , 453 , 451 , 454 }
(along with the above condition, it determines it is Chargebacks or Arbitration Chargebacks, either full or partial)
   and the transaction is in the list "ISSUER ENROLLMENT ICA"
   and the transaction is NOT in the list # "CHBK WHITELIST"
   and the transaction is NOT in the list "ISSUER OVERRIDE WHITELIST" (In case of system error, this can whitelist issuers to avoid blocks)
Then
   Advice GCMS to reject the transaction It should be understood that the thresholds (as described above) may also be used in conjunction with a whitelist to ensure limited and/or minimal friction to the banking institutions. Specifically, a chargeback dispute may be pending for up to 120 days in some scenarios. The white list of banking institutions may be used to account for a scenario in which a banking institution initiated a transaction through Route A, but then was added to the black list, whereby the transaction may still be completed consistent with Route A. The whitelist is checked, by the DMP 112, and dispute messages for banking institutions on the whitelist, which would be declined or rejected, are permitted. Such a whitelist is identified in Table 1 as CHBK WHITELIST, and includes a list of the banking institutions on the black list, where the banking institution is deleted from the whitelist after an interval, such as, for example, 120 days, to account for the above scenario. Various white lists (e.g., such as, for example, the "ISSUE OVERRIDE WHITELIST," etc.) may be employed in method 300 to guard against unintended and/or unduly burdensome consequences of the migration to the dispute engine 116 on one or more banking institutions.

With continued reference to FIG. 3, at 316 in the method 300, the DMP 112 determines whether the banking institution 104 was, or was not, found in the black list. Here, because the banking institution 104 has used the dispute engine 116, it has been appended to the black list (e.g., at 308, etc.). In method 300, therefore, the DMP 112 rejects, at 318, the dispute message (since it was transmitted outside of the dispute engine 116). In particular, for example, the DMP 112 may reject the dispute message by directing the GCMS 110 to reject the dispute message and to transmit a response including a generic blocking code. The banking institution 104 may inquire about the rejection, whereby a reason for the rejection may be provided. In at least one embodiment, the GCMS 110 may transmit a response, which includes a specific code indicative of a violation of rules associated with migration to the dispute engine 116.

Conversely, when the banking institution 106 submits a dispute message to the GCMS 110, and not to the dispute engine 116, the DMP 112 (like above) detects, at 310, the dispute message as being directed to the GCMS 110 from the banking institution 106 (being transmitted outside of the dispute engine 116). The DMP 112 then identifies, at 312, the banking institution 106 (e.g., from the ICA included in the dispute message, etc.) and searches, at 314, in the data structure 114, and specifically, the black list, for the banking institution 104 (or identifier associated therewith). Then, at 316, the DMP 112 determines whether the banking institution 106 was, or was not, found in the black list. Here, because the banking institution 106 has not previously submitted a dispute message to the dispute engine 116, it has also not been appended to the black list (e.g., at 308, etc.). Therefore, the DMP 112 permits, at 320, the dispute message to proceed to the GCMS 110.

In view of the above, the systems and methods herein provide migration from one or more services to one or more different services, whereby the users of the services are migrated consistent with use of the different services by the users. In this manner, the legacy services may be maintained as available to users, but access to the legacy services is restricted to users who have yet to utilize the new services. As such, users are permitted to use the legacy services until they migrate to the new services, while the DMP inhibits users from migrating backward to the legacy services for ease or convenience. What's more, through such migration features, the systems and methods herein promote, for example, in connection with certain financial transactions, efficient messaging to clearing services (or other services), whereby message traffic to the clearing services is reduced. Specifically, for example, in conventional dispute resolution services, chargeback messages are provided to and processed by the clearing services for each given dispute, regardless of whether the dispute is to be resolved in favor of the consumer or the merchant, and with further traffic still to come based on the outcome of the dispute resolution. The systems and methods herein enable migration to the dispute engine (or other suitable service), with a limitation and/or restriction on use of the prior legacy services, thereby reducing traffic to the prior legacy services (e.g., to the clearing service from the dispute resolution service, etc.) or eliminating traffic to the prior legacy services. As can be appreciated, by such migration network efficiency in handling messaging traffic may be improved.

Again, and as previously described, it should be appreciated that the functions described herein, in some embodiments, may be described in computer executable instructions stored on a computer-readable media, and executable by one or more processors. The computer-readable media is a non-transitory computer-readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) appending, by at least one computing device, a user to a black list of users in a data structure, in response to a first dispute message, associated with the user, transmitted from a service; (b) detecting, by the at least one computing device, a second dispute message transmitted from the user; (c) determining, by the at least one computing device, whether the user is included in the black list of users in the data structure; and (d) rejecting, by the at least one computing device, the dispute message when the user is included in the black list of users, thereby inhibiting the user from providing the dispute message apart from the service.

Exemplary embodiments are provided so that this disclosure will be thorough, and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in migration of users to one or more services offered by a service host, the method comprising:

detecting, by at least one computing device associated with a service host, a first dispute message associated with a user;

identifying, by the at least one computing device, the first dispute message as from a dispute service offered by the service host to a clearing service associated with the service host, based on a data element (DE) included in the first dispute message having a defined value;

identifying the user associated with the first dispute message;

in response to identifying the first dispute message as from the dispute services to the clearing services and identifying the user associated with the first dispute message, appending, by the at least one computing device, the user to a black list of users in a data structure;

detecting, by the at least one computing device, a second dispute message associated with the user and transmitted from the user to the clearing service via a legacy route, wherein the legacy route is to the clearing service outside of the dispute service;

in response to the second dispute message being transmitted via the legacy route, determining, by the at least one computing device, whether the user is included in the black list of users in the data structure; and rejecting, by the at least one computing device, the second dispute message when the user is included in the black list of users, thereby inhibiting the user from transmitting the second dispute message to the clearing service outside of the dispute service via the legacy route.

2. The computer-implemented method of claim 1, further comprising identifying, by the at least one computing device, the user based on a unique identifier for the user included in the first dispute message; and wherein appending the user to the black list of users in the data structure includes appending the unique identifier for the user to the black list.

3. The computer-implemented method of claim 2, wherein the user includes a banking institution;

wherein the dispute service offered by the service host includes a dispute resolution service associated with a dispute engine computing device; and wherein the first dispute message includes one of a first presentment chargeback, a representment, and an arbitration chargeback.

4. The computer-implemented method of claim 1, wherein appending the user to a black list of users includes appending the user to the black list of users when the first dispute message and a number of prior dispute messages associated with the user and transmitted from the dispute service satisfies a threshold.

5. The computer-implemented method of claim 4, wherein the second dispute message includes a message type indicator (MTI); and wherein detecting the second dispute message includes detecting the second dispute message based on the MTI included in the second dispute message.

6. The computer-implemented method of claim 1, wherein rejecting the second dispute message includes rejecting the second dispute message when the user is included in the black list of users and when the user is not included in a whitelist of users in the data structure.

7. The computer-implemented method of claim 1, further comprising:
detecting, by the at least one computing device, a third dispute message associated with a second user and transmitted from the second user to the clearing service via the legacy route, after appending the user to the black list;
determining, by the at least one computing device, whether the second user is included in the black list of users in the data structure; and
permitting, by the at least one computing device, the third dispute message to be processed by the clearing service when the second user is not included in the black list of users.

8. A payment network for use in migration of banking intuitions to one or more services offered by the payment network, the payment network comprising:
a dispute engine computing device configured to provide a dispute resolution service for transactions;
a clearing management computing device coupled to the dispute engine computing device, the clearing management computing device configured to provide a clearing service for transactions; and
a decision management platform coupled to the dispute engine computing device and the clearing management computing device, the decision management platform configured to:
detect a dispute message associated with a banking institution;
identify the dispute message as being transmitted from the banking institution, via one of: the dispute engine computing device or a legacy route, based on a data element (DE) included in the dispute message having a defined value;
in response to identifying the dispute message as being transmitted from the dispute engine computing device to the clearing management computing device,
identify the banking institution associated with the dispute message; and
append the identified banking institution to a black list of banking institutions in a data structure when the banking institution is not included in the black list of banking institutions; and
in response to the dispute message being transmitted via the legacy route from the banking institution to the clearing management computing device:
determine whether the banking institution is included in the black list of banking institutions in the data structure;
when the banking institution is included in the black list of banking institutions, cause the clearing management computing device to reject the dispute message, thereby inhibiting the clearing management computing device from processing the dispute message when received via the legacy route and not received from the dispute engine computing device; and
when the banking institution is not included in the black list of banking institutions, permit the clearing management computing device to process the dispute message, thereby permitting banking institutions that are not appended to the black list of banking institutions to provide the dispute message to the clearing management computing device apart from the dispute engine computing device via the legacy route.

9. The payment network of claim 8, wherein the decision management platform is configured to append the banking institution to the black list of banking institutions when the dispute message satisfies a threshold of dispute messages associated with the banking institution and is transmitted from the dispute engine computing device to the clearing management computing device.

10. The payment network of claim 9, wherein the threshold includes at least ten dispute messages.

11. The payment network of claim 9, wherein, in response to the dispute message being transmitted via the dispute engine computing device to the clearing management computing device, the decision management platform is further configured to permit the dispute message to proceed, thereby permitting the dispute message to be cleared by the clearing management computing device.

12. The payment network of claim 9, wherein, in response to the dispute message is transmitted via the banking institution to the clearing management computing device and when the banking institution is included in the black list of banking institutions, the decision management platform is further configured to reject the dispute message only when the banking institution is not included in a white list of banking institutions in the data structure.

13. The payment network of claim 8, wherein the dispute message includes one of a first presentment chargeback, a representment, and an arbitration chargeback.

14. The payment network of claim 8, wherein the decision management platform is configured to detect the dispute message based on a message type indicator (MIT) included in the dispute message.

15. A non-transitory computer-readable storage media including executable instructions for migrating users to one or more services offered by a service host, in connection with a subscription by the users for the one or more services, which when executed by at least one processor, cause the at least one processor to:
detect a first dispute message associated with a user;
identify the first dispute message as being transmitted from a first dispute service offered by a service host to a second service offered by the service host, based on a data element (DE) included in the first dispute message having a defined value;
identify the user associated with the first dispute message;
in response to identifying the first dispute message being transmitted from the first dispute service to the second service and identifying the user associated with the first dispute message, append the user to a black list of users in a data structure, when a number of dispute messages associated with the user from the first dispute service to the second service satisfies a predefined threshold;
detect a second dispute message associated with the user and transmitted from the user to the second service offered by the service host via a legacy route; and
in response to the second dispute message being transmitted via the legacy route, either:
reject the second dispute message when the user is included in the black list of users in the data structure, thereby inhibiting the user from providing the second dispute message directly to the second service via the legacy route when the first dispute service handled the number of dispute messages for the user satisfying the predefined threshold; or permit the second dispute message to be processed by the second service when the user is not included in the black list of users.

16. The non-transitory computer-readable storage media of claim 15, wherein each of the first and second dispute messages includes one of a first presentment chargeback, a representment, and an arbitration chargeback.

17. The non-transitory computer-readable storage media of claim 15, wherein the predefined threshold includes at least ten dispute messages.

* * * * *